(12) United States Patent
Paddock et al.

(10) Patent No.: US 9,841,027 B2
(45) Date of Patent: Dec. 12, 2017

(54) PUMP PRESSURE RELIEF SYSTEM

(71) Applicant: ITT MANUFACTURING ENTERPRISES LLC., Wilmington, DE (US)

(72) Inventors: Douglas Paddock, Penn Yan, NY (US); Mark A. Playford, Seneca Falls, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 1044 days.

(21) Appl. No.: 14/094,959

(22) Filed: Dec. 3, 2013

(65) Prior Publication Data
US 2014/0186154 A1 Jul. 3, 2014

Related U.S. Application Data

(60) Provisional application No. 61/732,554, filed on Dec. 3, 2012.

(51) Int. Cl.
*F16K 17/16* (2006.01)
*F04D 15/00* (2006.01)
(Continued)

(52) U.S. Cl.
CPC ........... *F04D 15/0083* (2013.01); *F04D 7/04* (2013.01); *F04D 15/0077* (2013.01);
(Continued)

(58) Field of Classification Search
CPC ........ F16K 17/14; F16K 17/16; F16K 17/162; F04D 15/0083
(Continued)

(56) References Cited

U.S. PATENT DOCUMENTS 3,658,206 A 4/1972 Barbier
4,488,856 A * 12/1984 Preble ................... F01D 15/08
417/409
(Continued)

FOREIGN PATENT DOCUMENTS

CN 1050600 A 4/1991
CN 2545448 Y 4/2003
(Continued)

OTHER PUBLICATIONS

2545448—English Language Abstract (1 page), Apr. 16, 2003.
DE10060608—English Language Abstract (1 page), Apr. 16, 2016.
1050600—English Language Abstract (3 pages).

*Primary Examiner* — Craig Schneider
*Assistant Examiner* — P. Macade Nichols
(74) *Attorney, Agent, or Firm* — Ware, Fressola, Maguire & Barber LLP

(57) ABSTRACT

A pump features a casing assembly having a region through which high velocity fluid and solids circulate, a chamber where they do not, an aperture that allows a related-chamber to be in fluidic communication with the region, but not the circulating high velocity fluid and solids, and a corresponding aperture to allow the related-chamber to communicate with an external region outside the casing assembly; and a rupture disc received in the corresponding aperture to close the related-chamber subjects the related-chamber and the rupture disc to pressure contained within the region and to release pressure exceeding a predetermined relief pressure of the rupture disc from the related-chamber to the external region or location, and exhaust piping couple the rupture disc to provide a path for escaping vapor and solids to be directed to the external region or location where the energy can be dissipated.

26 Claims, 8 Drawing Sheets

(51) Int. Cl.
*F04D 7/04* (2006.01)
*F04D 29/42* (2006.01)

(52) U.S. Cl.
CPC .......... *F04D 29/4286* (2013.01); *F16K 17/16* (2013.01); *F16K 17/162* (2013.01)

(58) Field of Classification Search
USPC ......... 137/68.19, 68.21, 68.23, 68.27, 68.25, 137/68.26
See application file for complete search history.

(56) References Cited

U.S. PATENT DOCUMENTS

| | | |
|---|---|---|
| 6,176,307 B1 | 1/2001 | Danos et al. |
| 7,086,473 B1 | 8/2006 | Bangash |
| 2004/0025936 A1 | 2/2004 | Wadkins |
| 2009/0067980 A1 | 3/2009 | Burgess |
| 2011/0311014 A1 | 12/2011 | Hottovy et al. |

FOREIGN PATENT DOCUMENTS

| | | |
|---|---|---|
| DE | 10060608 | 4/2002 |
| EP | 2447468 | 5/2012 |
| WO | 2011123892 | 10/2011 |

\* cited by examiner

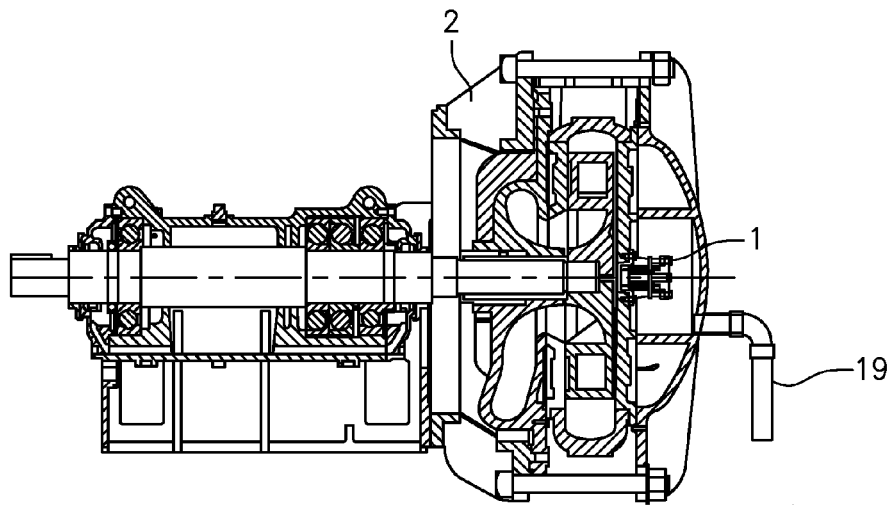
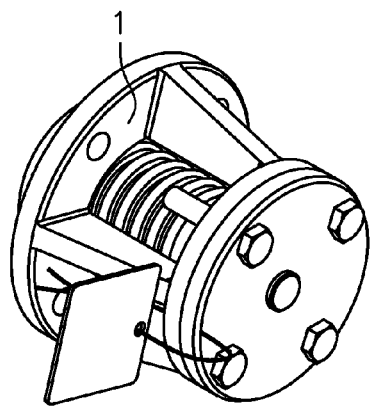
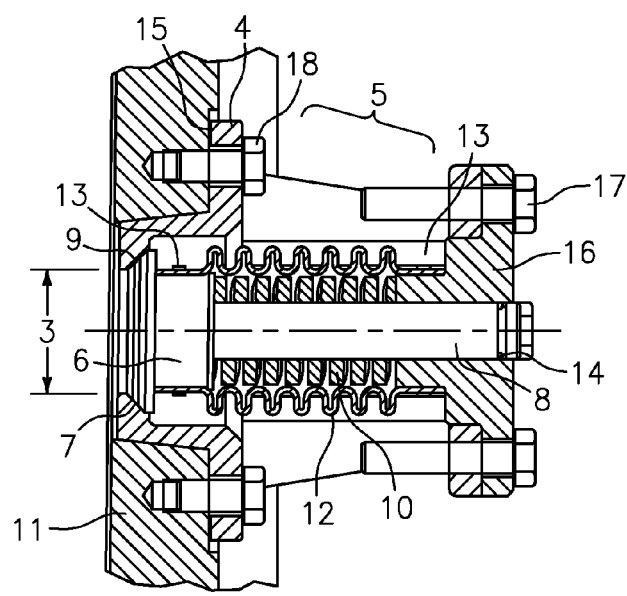
FIG. 1a
FIG. 1b
FIG. 1c
FIG. 1: Model RX
(PRIOR ART)

FIG. 2: Model 5500 (PRIOR ART)

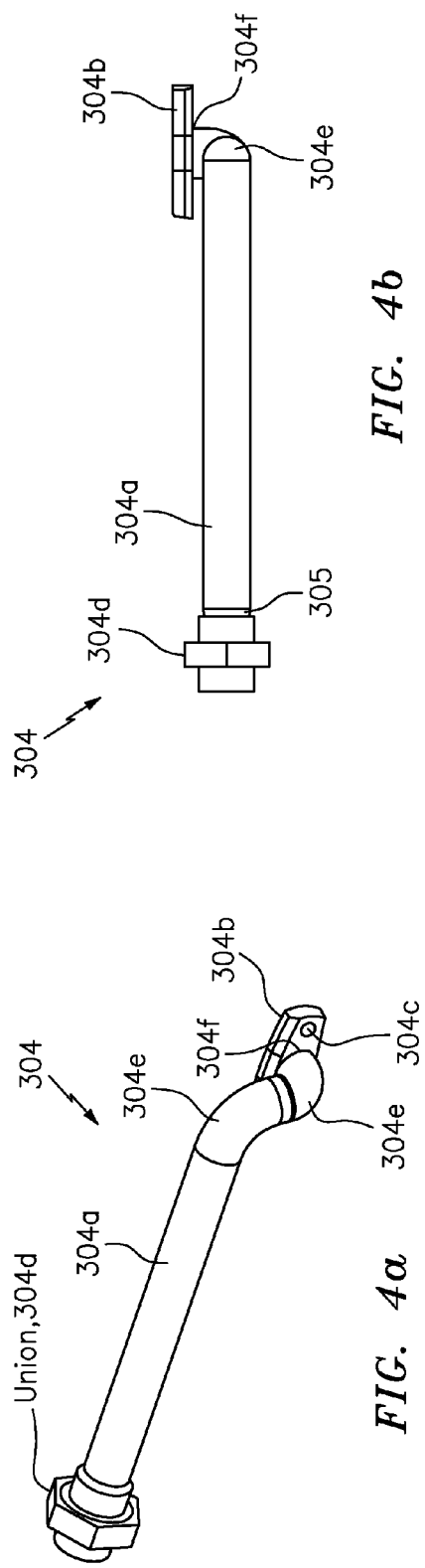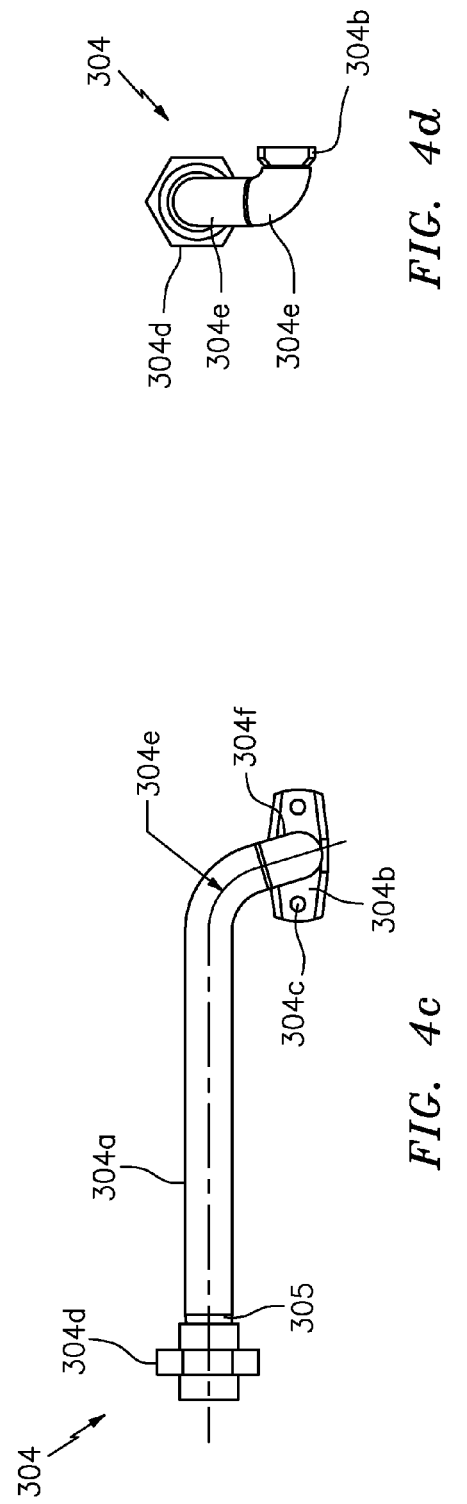
FIG. 4a
FIG. 4b
FIG. 4c
FIG. 4d
FIG. 4

PUMP PRESSURE RELIEF SYSTEM

CROSS-REFERENCE TO RELATED APPLICATION

This application claims benefit to provisional application Ser. No. 61/732,554, filed 3 Dec. 2012, which is hereby incorporated by reference in its entirety.

BACKGROUND OF THE INVENTION

Field of the Invention

The present invention relates to a pump or pumping assembly, arrangement or combination; and more particularly relates to a new technique for relief of internal pressure should the maximum allowable working pressure of such a pump or pumping assembly, arrangement or combination be exceeded, e.g., including a centrifugal slurry pump.

Brief Description of Related Art

In certain processing facilities, it is possible to plug both the suction and discharge lines leading to a pump, especially a centrifugal slurry pump. When both lines are plugged in this fashion, and the pump continues to run, nearly all the energy transmitted by the electric motor or other source of energy input goes into heating the fluid (e.g. water) and solids (e.g. ore particles) contained in the pump, suction and discharge piping. If the pump runs for a long enough period of time, the fluid and solids will increase in temperature to the point that the fluid's vapor pressure exceeds the ability of the pump to retain the fluid and solids. At that point, the pump's casing will rupture, allowing hot vapor and solids to rapidly escape. Since the casing is often made of hard, brittle material (e.g. chrome iron), it is possible for the casing to fracture into multiple pieces, and for some of the pieces to be thrown significant distances with substantial force. Were any of these pieces to make contact with a person, serious injury or death could result.

Most pumps sold today do not make any provision for relief of internal pressure should the pump or casing's ability to retain that pressure be exceeded.

Two known pumps, including Model RX (FIG. 1) and Model 5500 (FIG. 2) pumps, may have pressure relief valves installed therein.

For example, FIG. 1, including FIGS. 1a to 1c, shows a spring-loaded slurry pump internal relief valve 1 arranged in the Model RX slurry pump 2 that is known in the art. In FIGS. 1a to 1c, the spring-loaded slurry pump internal relief valve 1 is designed to provide overpressure protection for the slurry pump 2. It is mounted to the pump 2 in an area of minimum wear by the abrasive slurry. The spring-loaded slurry pump internal relief valve 1 has a throat diameter 3 large enough to relieve large quantities of high gravity slurry. The valve body 4 is designed to have a large open exit area 5 for the slurry once it leaves the valve throat. The valve body 4 is manufactured of steel or ductile iron. The spring-loaded slurry pump internal relief valve 1 has a plunger 6 which includes a tapered valve seat 7 and a stem 8 for guidance during operation. The valve plunger 6 has an O-ring groove (unlabeled) on the tapered seat for an O-ring 9 that provides the seal for the valve throat. The valve plunger 6 is made from stainless steel to prevent sticking by corrosion. The spring-loaded slurry pump internal relief valve 1 uses a compression spring 10, sized to relieve internal pump pressures at or slightly above the maximum allowable working pressure. The compression spring 10 is a large spring that provides a significant barrier to prevent accidental relief. The spring-loaded slurry pump internal relief valve 1 is mounted internally to one of the hardened metal wear components of the pump (i.e. liner 11, casing, suction cover). It has an elastomer bellows 12 to protect the compression spring 10 from caking up or corroding due to the environment usually found in and around slurry pumps. The rubber bellows 12 is held in place by two cable ties 13. The valve stem has an O-ring 14 that seals the end of the valve stem 8 to keep dirt, grit, and scale from binding the spring-loaded slurry pump internal relief valve 1 and preventing operation. The spring-loaded slurry pump internal relief valve 1 uses a gasket 15 or O-ring to seal between it and the hard metal components of the pump. The relief valve 1 has an end cap 16 that is used to compress the spring to a pre-determined load. The end cap 16 is held in place and the compression spring 10 is compressed by threaded fasteners 17. The end cap 16 also acts as a guide for the stem 8 during operation. The spring-loaded slurry pump internal relief valve 1 is attached to a hardened liner 11 by threaded fasteners 18. The spring-loaded slurry pump internal relief valve 1 is non-adjustable to prevent intentional or inadvertent setting changes in the field. An exhaust pipe 19 is threaded to the Model RX slurry pump 2 and provides a path for the released material and directs it downward to the outside atmosphere.

FIG. 2, including FIGS. 2a to 2b, shows a pressure relief valve 30 arranged in a Model 5500 pump 40 that is known in the art. Due to the pump's predetermined configuration, no piping system is easily configured or incorporated in the Model 5500 pump 40, so escaping vapor and solids cannot be directed to a safe location.

The following is a brief discussion of known methods to deal with this pressure relief situation and some of the disadvantages of the known techniques, including:

A rupture disc may be installed in a portion of a pump's casing that exhausts essentially directly to the atmosphere. A cover may be installed to deflect the exhaust somewhat, but the hot vapor and solids may still cover a considerable distance rapidly.

A pressure relief valve assembly provides a mechanism that differs from the rupture disc, but the exhaust method is similar.

The aforementioned Model RX pumps shown in FIG. 1a having both a pressure relief valve and exhaust piping has the pressure relief valve mounted in direct contact with the fluid and solids. The pressure relief valve could be subject to wear and premature pressure relief. A rupture disc may be used instead of a pressure relief valve, but it would also be mounted in direct contact with the fluid and solids and subject to premature pressure relief. Exhaust is into a chamber and the exhaust piping is configured to pipe away vapor and solids should a pressure release occur. However, the pressure relief valve or rupture disc is also not directly accessible for repairs.

The aforementioned Model 5500 pumps mount the pressure relief device communicating with a chamber which protects the device from direct contact with the high velocity fluid and solids. However, no provision for piping away the exhaust is made or implemented. The pressure relief device is fairly accessible for repair purposes.

Furthermore, other techniques include detecting when fluid is not circulating through a centrifugal pump with electronic means. In this situation, the power input would be reduced or eliminated, thus preventing the internal pressure/temperature buildup. No pressure relief would be required.

In view of the aforementioned, there is a need in the pump industry for an improved design or technique that solves the problems related to providing relief of internal pressure should the maximum allowable working pressure of an industrial pump or pumping assembly, arrangement or combination be exceeded, including a centrifugal slurry pump.

SUMMARY OF THE INVENTION

By way of example, and according to some embodiments, the present invention provides apparatus that may take the form of a pump or rotary equipment, featuring a combination of a casing assembly and pressure relief system.

The casing assembly may be configured with an inner casing to form a region through which high velocity fluid and solids circulate, configured with an outer casing to form a chamber between the inner casing and the outer casing that does not have circulating therein the high velocity fluid and solids, and also configured with a seal cover arranged between the inner casing and the outer casing. The inner casing may be configured with an aperture that, together with the seal cover, creates a related-chamber that is in fluidic communication with the region of the inner casing through which high velocity fluid and solids circulate, but also does not have circulating therein the high velocity fluid and solids. The seal cover may be configured to form a corresponding aperture to allow the related-chamber to be in fluidic communication with an external region or location outside the casing assembly.

The pressure relief system may include a combination of a rupture disc assembly and an exhaust piping arrangement.

The rupture disc assembly may include a rupture disc configured to be received in the corresponding aperture of the seal cover and to close the related-chamber so communication of the related-chamber with the region subjects the related-chamber and the rupture disc to at least a portion of pressure contained within the inner casing, and also configured to release pressure exceeding a predetermined relief pressure of the rupture disc from the related-chamber to the external region or location.

The exhaust piping arrangement may include exhaust piping configured to attach to the casing assembly, couple the rupture disc assembly in the corresponding aperture of the seal cover, and provide from the related-chamber a path for escaping vapor and solids to be directed to the external region or location where the energy can be safely dissipated without risk of damage or injury.

In effect, the present invention provides apparatus that may include, or take the form of, a system having several parts that allows relief of pressure at a level below that of the casing so that the casing cannot fracture and throw pieces. The system further contains escaping vapors and solids and directs this exhaust to a region or location where the energy can be safely dissipated without risk of damage or injury.

According to some embodiments of the present invention, the apparatus and/or system may be comprised of, or take the form of, some combination of several of the following elements:

A centrifugal slurry pump that has, or may include, the outer casing, e.g., made of a ductile material (e.g. ductile iron or steel) that surrounds and supports the inner casing so as to form the related-chamber.

The inner casing may be made of, e.g., a hard brittle material or a soft elastomeric material (e.g. natural rubber) through which high velocity fluid and solids circulate.

The rupture disc will release pressure exceeding the design pressure of the disc.

The seal cover may be configured to close the aperture within the inner casing and be held in place by the outer casing and create the related-chamber that communicates with the region of the inner casing through which high velocity fluid and solids circulate, but that does not have high velocity fluid and solids circulating within it. Communication of the related-chamber with the inner casing subjects the related-chamber and rupture disc to at least a portion of the pressure contained within the casing. Separation of the rupture disc from the high velocity fluid and particles prevents wear of the rupture disc which would result in premature release of pressure.

Exhaust piping may be attached to the outer casing and/or seal cover and arranged in such a manner to as to couple and/or clamp the rupture disc in place in relation to the related-chamber and provide the path for escaping vapor and solids to be directed to the external region or location where the energy can be safely dissipated without risk of damage or injury.

The system mounts the rupture disc communicating with the related-chamber where it is not directly exposed to the high velocity fluid and solids (as it could be in the prior art Model RX shown in FIG. 1a) and pipes away any exhaust that occurs should the disc rupture. There is no known product, pump or rotary equipment that combines all of these new and unique safety features.

In operation, in the event a centrifugal slurry pump's suction and discharge piping become plugged while it continues to operate, advantages of the present invention may include the following:

Relief pressure can be set at a pressure less than the pump's maximum allowable working pressure, rather than having the casing rupture and, potentially, throw pump pieces.

Exhaust can be directed to another vessel, a higher elevation or some other location where the high temperature vapor and solids can cool and reduce velocity to the point where they will not cause damage or injury.

The rupture disc is a part that can be easily accessed and replaced readily should its pressure be exceeded and it activates.

Cost of the rupture disc and time to replace it are considerably less than the cost of a casing and time required to replace it.

The nature of the rupture disc, once it activates, prevents restarting the equipment (without severe leakage) unless it is replaced. This allows the root cause (e.g. plugged piping) to be identified and corrected.

Mounting the rupture disc in communication with a separate chamber that does not have high velocity fluid within it eliminates the possibility for wear and premature rupture.

According to some embodiments, and by way of further example, the present invention may take the form of apparatus, including a pump or rotary equipment, featuring the following:

The casing assembly may be configured consistent with that set forth above.

The rupture disc may include a concave surface with a scoring pattern configured with at least one line, groove, scratch or notch, and the at least one line, groove, scratch or notch may include, or take the form of, one of the following scoring patterns:

a single straight line, groove, scratch or notch configured diagonally extending about 80% of the total distance of the diameter; or two lines, grooves, scratches or notches configured to intersection at a central point and form an X-shape, e.g., including being perpendicular forming a cross or a plus sign; or three lines, grooves, scratches or notches configured to meet at a central point and form a Y-shape; or five lines, grooves, scratches or notches configured to meet at a central point and form a star shape.

Further, the rupture disc assembly may include a flange configured with at least one related aperture to receive at least one fastener to couple the flange to an outer surface of the outer casing and/or seal cover and the rupture disc assembly in the corresponding aperture of the outer casing and/or seal cover.

Furthermore, the exhaust piping may include a corresponding flange configured with at least one associated aperture to receive the at least one fastener in order to couple together the corresponding flange and the flange of the rupture disc assembly.

According to some embodiments, the present invention may take the form of apparatus, including a pump or rotary equipment, featuring a casing assembly in combination with a pressure relief system. The casing assembly may be configured with a region through which high velocity fluid and solids circulate, a chamber that does not have circulating therein the high velocity fluid and solids, an aperture that allows a related-chamber to be in fluidic communication with the region through which high velocity fluid and solids circulate, but also does not have circulating therein the high velocity fluid and solids, and a corresponding aperture to allow the related-chamber to be in fluidic communication with an external region or location outside the casing assembly. The pressure relief system may be configured with a rupture disc assembly having a rupture disc configured to be received in the corresponding aperture and to close the related-chamber so communication of the related-chamber with the region through which high velocity fluid and solids circulate subjects the related-chamber and the rupture disc to at least a portion of pressure contained within that region and also configured to release pressure exceeding a predetermined relief pressure of the rupture disc from the related-chamber to the external region or location, and an exhaust piping arrangement having exhaust piping configured to attach to the casing assembly and/or seal cover, couple the rupture disc assembly in the corresponding aperture, and provide from the related-chamber a path for escaping vapor and solids to be directed to the external region or location where the energy can be dissipated.

All of the above combined into a system creates a unique offering and contribution to the state of the art.

In addition to centrifugal slurry pumps, the system could be incorporated into other types of centrifugal pumps, positive displacement pumps and equipment where fluid or fluid/solids mixtures could be subject to energy input in excess of the equipment's ability to dissipate that energy, causing buildup of pressure to the point that it exceeds the equipment's pressure retention capability.

BRIEF DESCRIPTION OF THE DRAWING

The drawing includes the following Figures, not necessarily drawn to scale:

FIG. 1, including FIGS. 1a to 1c, shows a Model RX pump that is known in the art, including FIG. 1a which shows a cross-section view of the Model RX pump; FIG. 1b which shows a perspective view of a pressure relief valve that forms part of the Model RX pump shown in FIG. 1a; and FIG. 1c which shows a cross-section of the pressure relief valve shown in FIG. 1b.

FIG. 2, including FIG. 2b which shows a cross-sectional view of the Model 5500 pump shown in FIG. 2a once assembled.

FIG. 3a which shows a partial cross sectional view of a pressure relief assembly indicated by reference label 300; and FIG. 3b which shows a partial back perspective view of the pump in FIG. 3.

FIG. 4, including FIGS. 4a to 4d, shows an exhaust piping arrangement according to some embodiments of the present invention, including FIG. 4a, which shows a perspective view of the exhaust piping arrangement; FIG. 4b which shows a top down view of the exhaust piping arrangement shown in FIG. 4a; FIG. 4c which shows a back partial cross-sectional view of the exhaust piping arrangement shown in FIG. 4a; and FIG. 4d which shows a side view of the exhaust piping arrangement shown in FIG. 4a.

FIG. 5, including FIG. 5b which shows a front plan view of the rupture disc assembly in FIG. 5a; FIG. 5c which shows a top plan view of the rupture disc assembly shown in FIG. 5a; FIG. 5d which shows a back plan view of the rupture disc assembly shown in FIG. 5a; and FIG. 5e which shows a cross-sectional view of the rupture disc assembly shown in FIG. 5b along lines 5e-5e as shown.

Figure 2A:
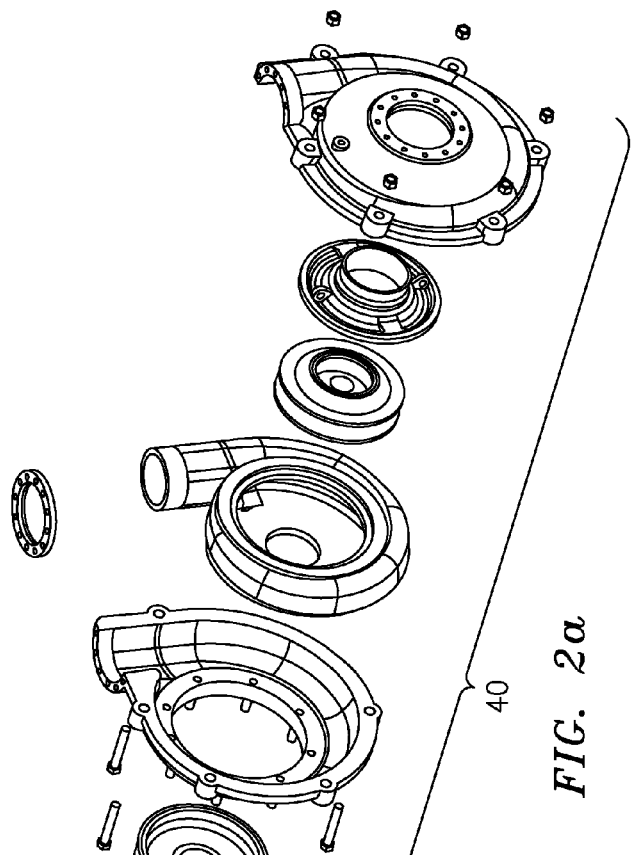
FIGS. 2a to 2b, shows a Model 5500 pump that is known in the art, including FIG. 2a which shows an exploded view of the Model 5500 pump.
Figure 2B:
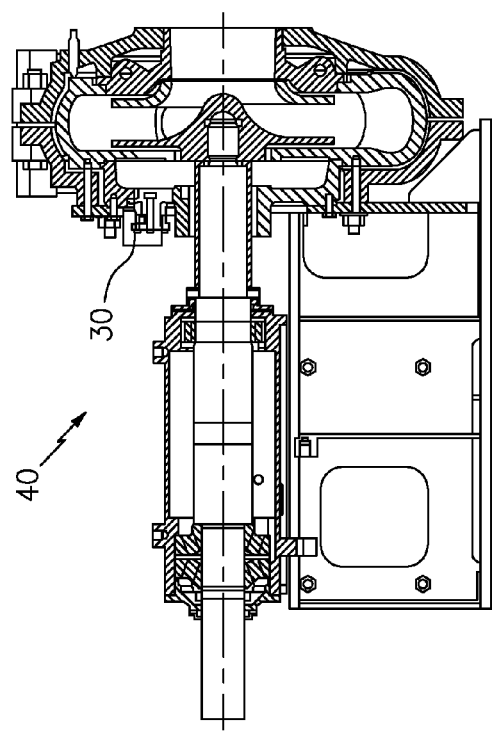

In the following description of the exemplary embodiment, reference is made to the accompanying Figures in the drawing, which form a part hereof, and in which is shown by way of illustration an embodiment in which the invention may be practiced. It is to be understood that other embodiments may be utilized, as structural and operational changes may be made without departing from the scope of the present invention.

DETAILED DESCRIPTION OF THE INVENTION

Figure 3:
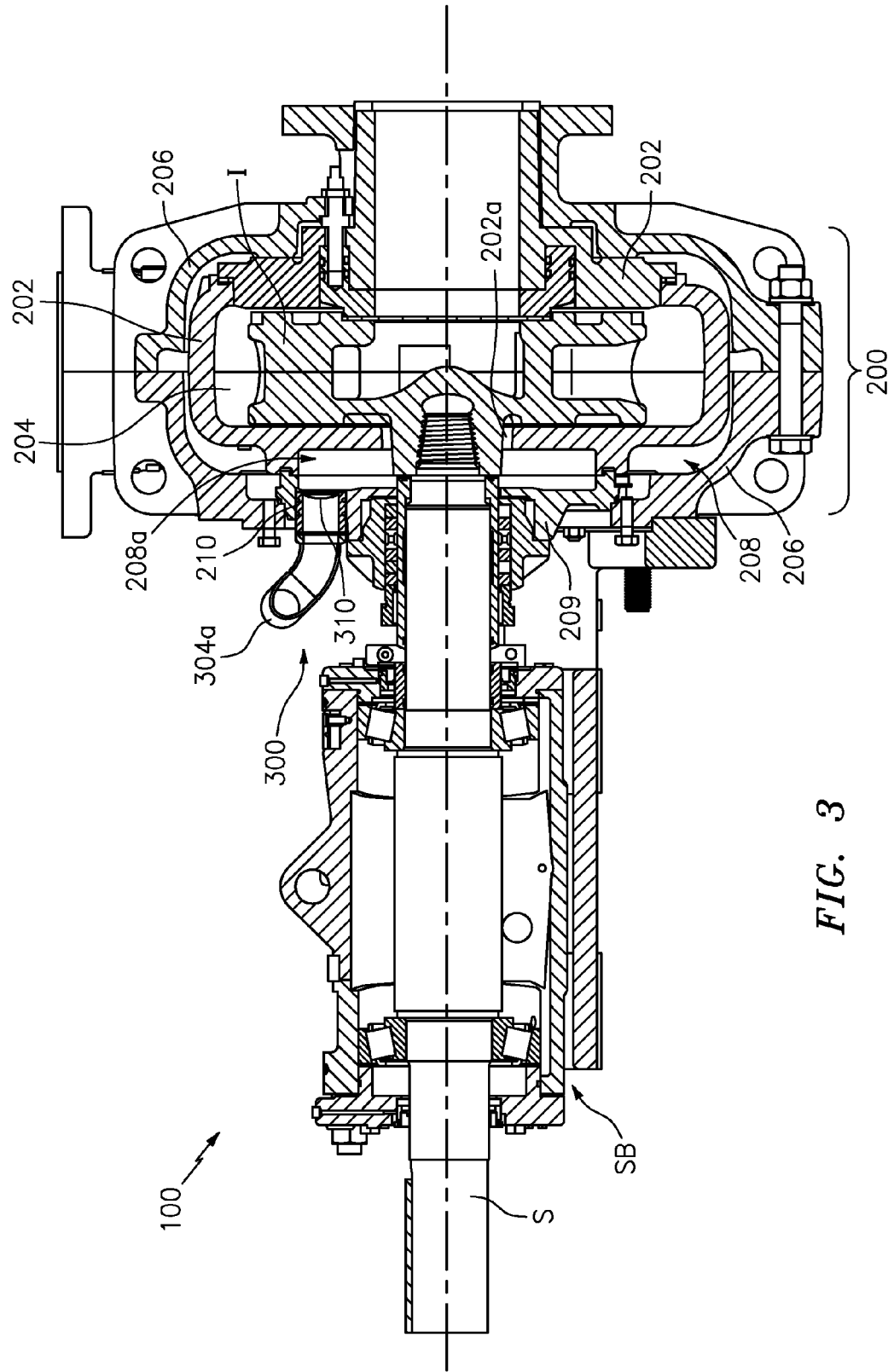
FIGS. 3, 3a and 3b show a pump according to some embodiments of the present invention, including FIG. 3 which shows a cross sectional view of the pump.
Figure 3A:
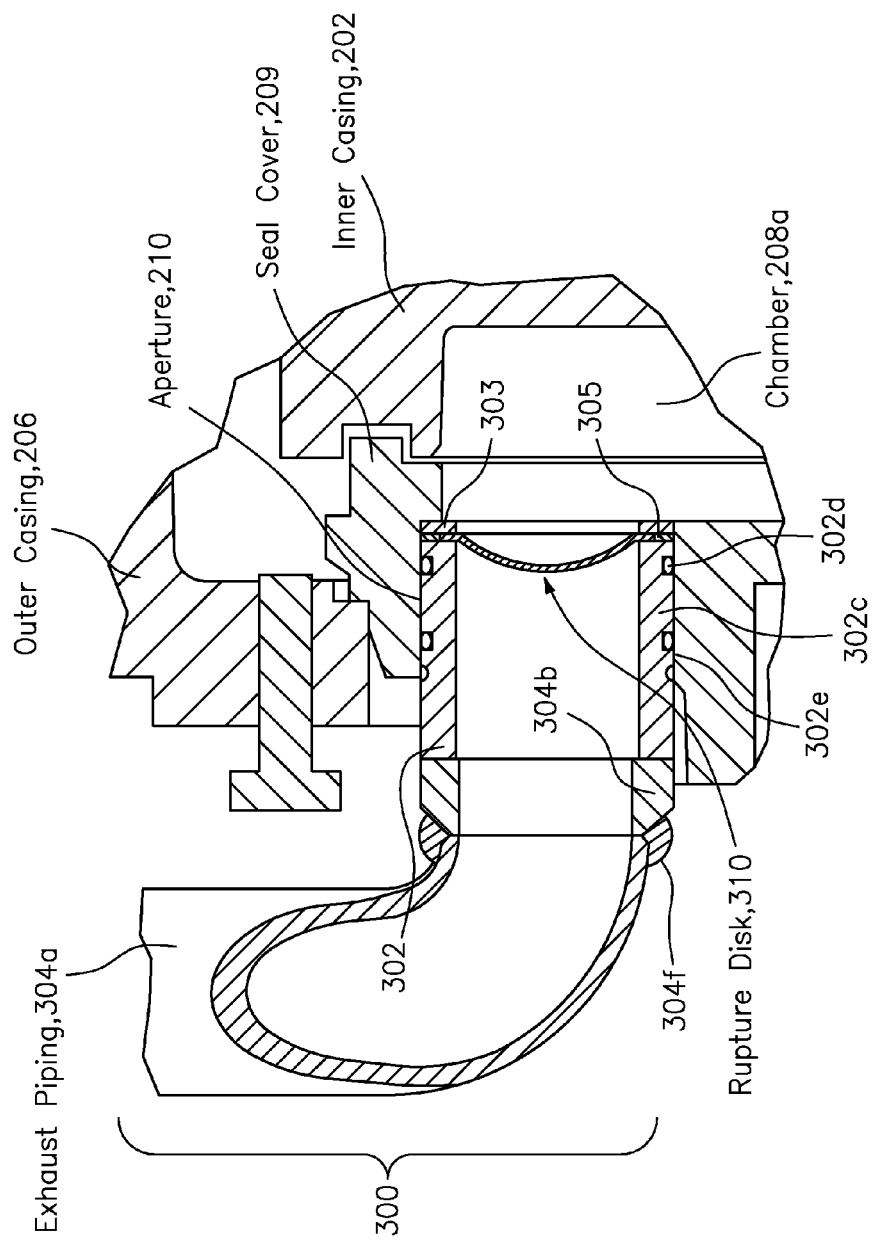
Figure 3B:
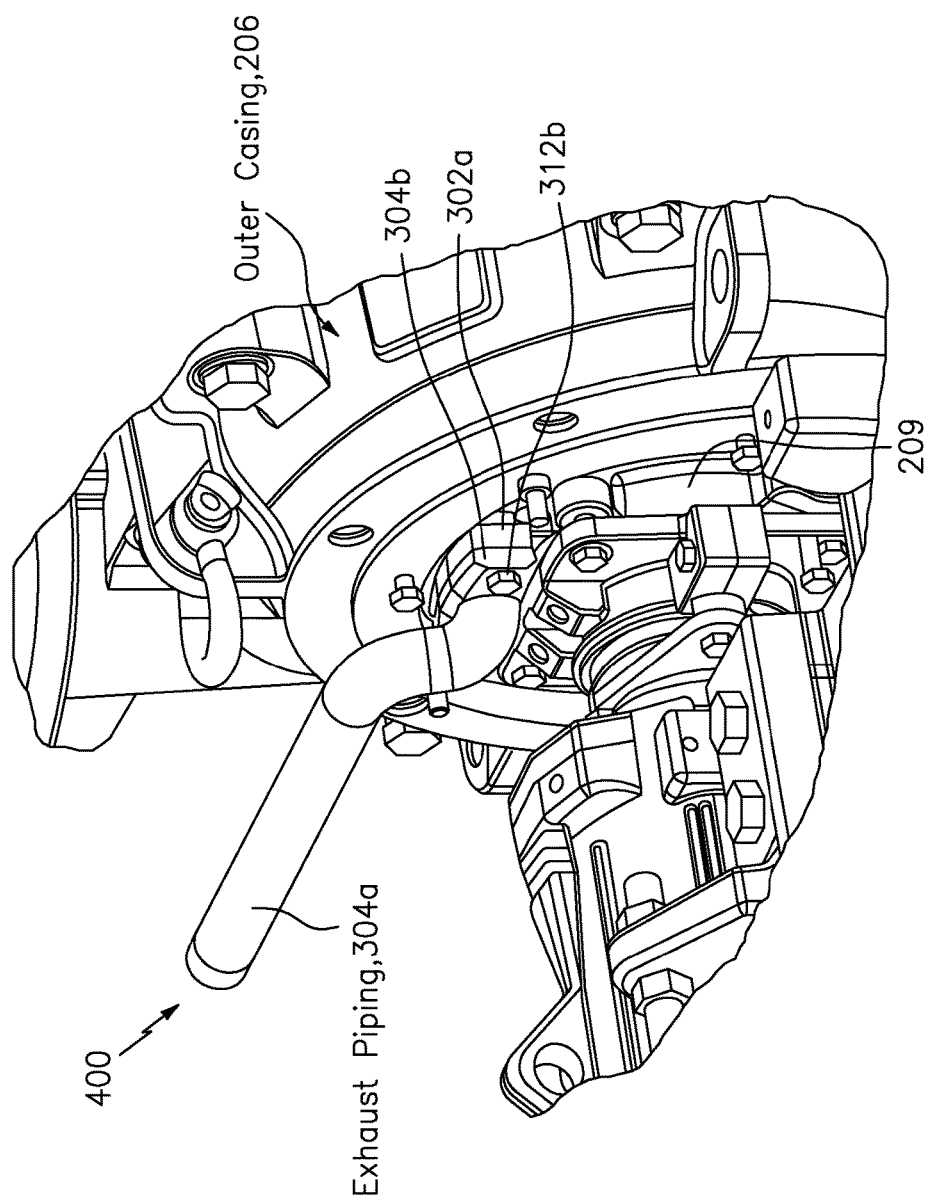

FIGS. 3, 3a and 3b show apparatus generally indicated as 100 according to some embodiments of the present invention in the form of a pump, featuring a casing assembly generally indicated as 200 and a pressure relief system generally indicated as 300 (see FIGS. 3 and 3a).

The casing assembly 200 may be configured with an inner casing 202 to form a region 204 through which high velocity fluid and solids (not shown) circulate, configured with an outer casing 206 to form a chamber 208 between the inner casing 202 and the outer casing 206 that does not have circulating therein the high velocity fluid and solids, and also configured with a seal cover 209 arranged between the inner casing 202 and the outer casing 206. The inner casing 202 may be configured with an aperture (e.g., indicated by reference numeral 202a) that, together with the seal cover 209, creates a related-chamber 208a that is in fluidic communication with the region 204 of the inner casing 202 through which high velocity fluid and solids circulate, but also does not have circulating therein the high velocity fluid and solids. The outer casing 206 and/or seal cover 209 may be configured to form a corresponding aperture 210 (FIG. 3a) to allow the related-chamber 208a to be in fluidic communication with an external region or location generally indicated as 400 (FIG. 3b) outside the casing assembly 200, e.g., in the event of a rupture condition consistent with that set forth below. The external region or location 400 outside the casing assembly 200 is understood to be far enough away from the pump or rotary equipment so that in the event of the rupture condition the exhaust is safely released or processed.

The pressure relief system 300 may include a combination of a rupture disc assembly generally indicated as 302 (see FIG. 3a and also FIG. 5) and an exhaust piping arrangement generally indicated as 304 (see FIG. 4).

The rupture disc assembly 302 may include a rupture disc 310 configured to be received in the corresponding aperture 210 formed by the seal cover 209 and to close the related-chamber 208a so communication of the related-chamber 208a with the region 204 subjects the related-chamber 208a and the rupture disc 310 to at least a portion of pressure contained within the inner casing 202, and also configured to release pressure exceeding a predetermined relief pressure of the rupture disc 310 from the related-chamber 208a to the external region or location 400 (see FIG. 3b).

The exhaust piping arrangement 304 may include exhaust piping 304a configured to attach to the casing assembly 200, couple the rupture disc assembly 302 in the aperture 210 of the seal cover 209, and provide from the related-chamber 208a a path for escaping vapor and solids to be directed to the external region or location 400 where the energy can be dissipated, e.g., without risk of damage or injury to people or to other equipment in the area surrounding the pump.

In operation, and according to some embodiments of the present invention, the casing assembly 200 may be configured to withstand a predetermined internal pressure without rupturing one or more of, e.g., the inner casing 202, the outer casing 206, or the seal cover 209, and the predetermined relief pressure of the rupture disc 310 may be configured at a rupture pressure that is less than the predetermined internal pressure of the casing assembly 200, so that the rupture disc 310 ruptures rather than, e.g., the inner casing 202, the outer casing 206 or the seal cover 209 that form part of the casing assembly 200.

By way of example, the rupture disc assembly 302 may include a flange 302a configured with at least one aperture 302b to receive at least one fastener generally labeled with reference numeral 312b to couple the flange 302a to an outer surface of the outer casing 206 and/or seal cover 209 and the rupture disc assembly 302 in the aperture 210 (FIGS. 3 and 3a) of the outer casing 206 and/or seal cover 209, as best shown in FIG. 3b.

Consistent with that shown in FIGS. 3, 3a and 3b, the apparatus 100, e.g., may also include other elements or components that do not form part of the underlying invention, as would be appreciated by a person skilled in the art, and thus are not described herein in detail, including a shaft S, a shaft bearing arrangement generally indicated as SB, an impeller I attached to the shaft S, nuts and bolts, etc. As a person skilled in the art would also appreciate, the shaft S may be coupled to a motor (not shown) arranged in some portion of the pump 100 shown in FIGS. 3, 3a and 3b.

By way of example, in FIG. 3 the aperture 202a of the inner casing 202 is formed or configured, or takes the form of an opening, where the impeller I passes through the inner casing 202. However, the scope of the invention is intended to include, and embodiments are envisioned in which, the inner casing 202 is formed or configured with other types, kinds or configurations of aperture(s) in order to achieve the desired functionality of allowing the related-chamber 208a to be in fluidic communication with the region 204 of the inner casing 202 through which high velocity fluid and solids circulate, but also does not have circulating therein the high velocity fluid and solids, within the spirit of the underlying invention.

FIG. 4: The Exhaust Piping Arrangement

By way of example, FIG. 4 shows the exhaust piping arrangement 304, according to some embodiments of the present invention.

In FIG. 4, the exhaust piping 304a may include a flange 304b configured with at least one related aperture 304c to receive the fastener 312b (FIG. 3b) in order to couple together the corresponding flange 304b and the flange 302a to the outer surface of the outer casing 206 and/or seal cover 209 and the rupture disc assembly 302 in the aperture 210 (FIGS. 3 and 3a) of the outer casing 206 and/or seal cover 209.

Consistent with that shown in FIG. 4, the exhaust piping arrangement 304 may include multiple exhaust pipings 304a, e.g., coupled together using one or more unions or couplers 304d, as shown. The exhaust piping 304a, and unions or couplers 304d, may be coupled together or connected using a threading technique that may include, or take the form of, pipings and couplers having corresponding threadings, one threading of which is indicated by reference label 305. The unions or couplers 304d may also be configured as flanges.

The exhaust piping 304a, may also include one or more elbow piping sections 304e for shaping and directing the exhaust piping arrangement 304, away from the pump to the external region or location 400 (FIG. 3b).

Embodiments may include the exhaust piping 304a, being welded to the flange 304b, via a welding joint 304f, as well as the combination being formed as an integral unit without welding.

Further, the embodiment in FIG. 4 is provided by way of example, and embodiments are envisioned, and the scope of the invention is intended to include using other types or kinds of exhaust piping arrangements in addition to that indicated by reference labels 304 and shown in FIG. 4.

FIG. 5: The Rupture Disc Assembly

Figure 5A:
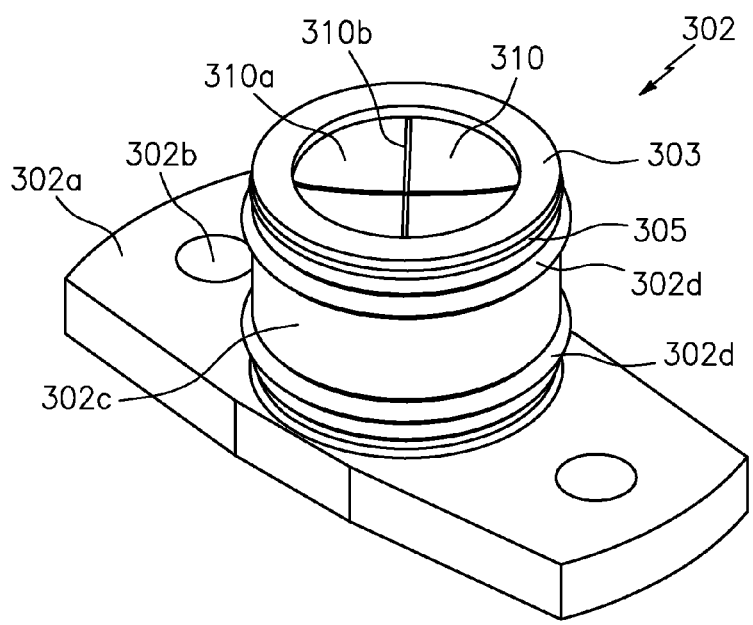
FIGS. 5a to 5e, shows a rupture disc assembly according to some embodiments of the present invention, including FIG. 5a which shows a top perspective view of the rupture disc assembly.
Figure 5B:
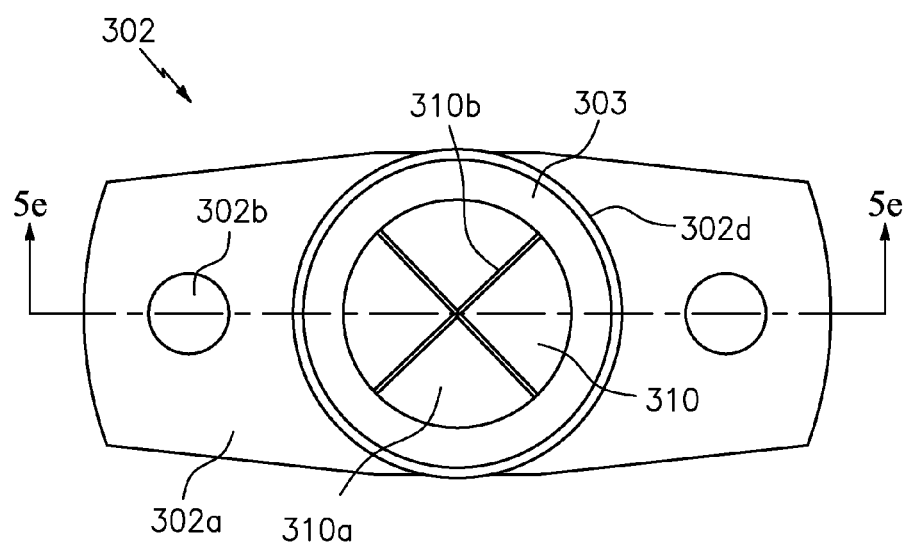
Figure 5C:
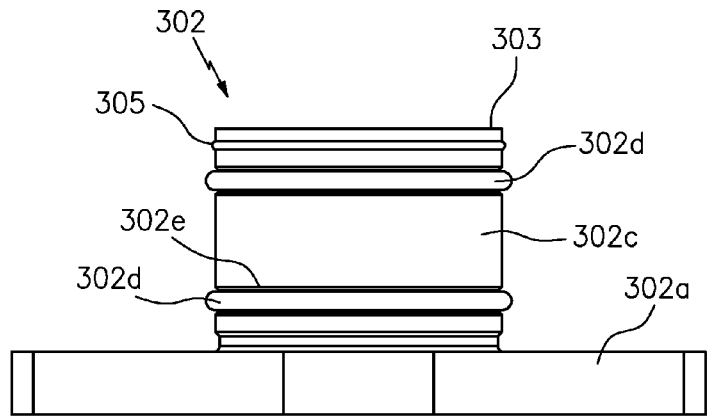
Figure 5D:
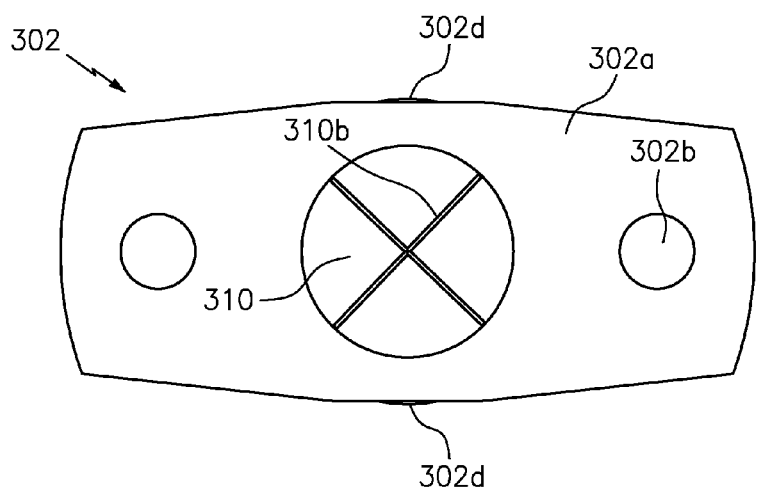
Figure 5E:
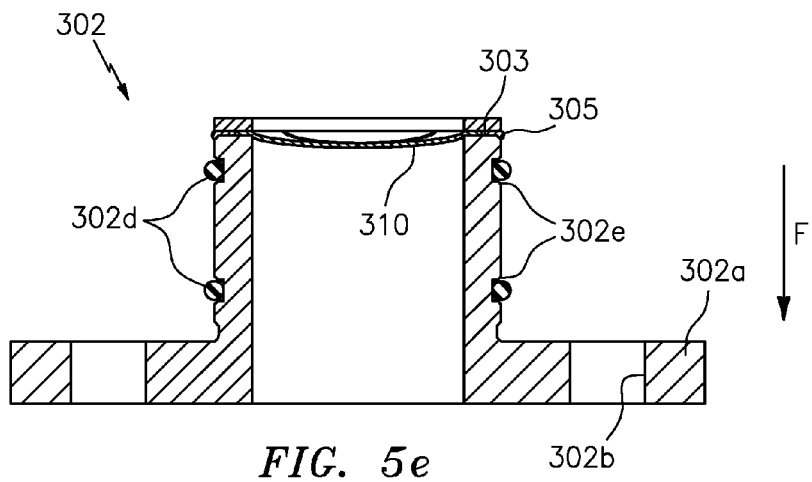

FIG. 5 shows the rupture disk assembly 302. In particular, the rupture disc 310 comprises a surface 310a configured as a flat surface, or a concave surface, or a convex surface. The surface 310a may include a scoring pattern 310b configured with at least one line, groove, scratch or notch, as shown. The scoring pattern 310b may be configured to have high predictability and reliability in activating at the predetermined relief pressure, e.g., including where the predictability and reliability has a confidence interval in the range of about 95%. The at least one line, groove, scratch or notch may include, or take the form of, one of the following scoring patterns:

a single straight line, groove, scratch or notch configured diagonally extending about 80% of the total distance of the diameter; or two lines, grooves, scratches or notches configured to intersection at a central point and form an X-shape, e.g., including being perpendicular forming a cross or a plus sign, as shown in FIG. 5a, 5b and 5d; or three lines, grooves, scratches or notches configured to meet at a central point and form a Y-shape; or five lines, grooves, scratches or notches configured to meet at a central point and form a star shape.

Embodiments are envisioned, and the scope of the invention is intended to include, using other types or kinds of scoring patterns either now known or later developed in the future within the spirit of the present invention, e.g., including spiral scoring patterns. The scope of the invention is also not intended to be limited to the depth or shape of the scoring pattern in the surface 310a of the rupture disc 310, e.g., including rectangular or V-grooved.

Embodiments are envisioned, and the scope of the invention is intended to include, using no scoring pattern, so as to have a smooth surface.

The rupture disc 310 may be made of a material that has high predictable mechanical properties and does not corrode when subjected to an adverse environment.

The rupture disc 310 may also be configured to rupture when the pressure in the related-chamber 208a substantially correlates to a pressure in a volute of a pump or rotary equipment that is near a maximum allowable working pressure (MAWP) of the volute of the pump or rotary equipment, including where the rupture disc is configured to rupture at about 200 PSI at about 300° F. (In some embodiments, the pressure in the related-chamber 208a is actually likely to be less than the pressure in the volute due to the pumping action of the vanes on the back of the impeller.) When the rupture disc 310 ruptures, the exhaust will flow in the direction indicated by the arrow F in FIG. 5e so that it travels through the exhaust piping 304a and out to the external region or location 400 (FIG. 3b).

The rupture disc assembly 302 may include a ring-like member 303 and a cylindrical wall or body 302c configured to receive and hold the rupture disc 310, e.g., via a welding bead or joint 305. The cylindrical wall or body 302c is configured in relation to corresponding walls of the aperture 210 (FIG. 3a) of the outer casing 206 and/or seal cover 209. By way of example, the cylindrical wall or body 302c and the rupture disc 310 may be welded together via the welding bead or joint 305 so as to form an integral unit, or may be formed or molded as an integral unit. Embodiments are envisioned, and the scope of the invention is intended to include, using other types or kinds of configurations either now known or later developed in the future for coupling the rupture disc 310 and the cylindrical wall or body 302c together, e.g., using some other member besides the ring-like member 303 and some other coupling technique besides welding joint 305. For example, embodiments are envisioned in which the rupture disc may not have a flange assembly and may be made smaller and held in placing using a different manner or technique within the spirit of the underlying invention.

The rupture disc assembly 302 may include at least one O-ring 302d, and the cylindrical wall 302c may be configured with at least one annular groove or channel 302e to receive and retain the at least one O-ring 302d.

The separation of the rupture disc 310 from the region 204 (FIG. 3) through which high velocity fluid and solids circulate substantially reduces or prevents wear of the rupture disc 310 which would otherwise result in a premature release of the pressure.

By way of example, the rupture disc 310 may be configured with a thickness of about 0.008 inches, where the thickness thereof will depend in part on the type or kind of materials being used. In view of this, the scope of the invention is not intended to be limited to any particular thickness of the rupture disc 310, or any particular material from which it may be made.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. An apparatus, including a pump or rotary equipment, comprising:

a casing assembly configured with an inner casing to form a region through which high velocity fluid and solids circulate, configured with an outer casing to form a chamber between the inner casing and the outer casing that does not have circulating therein the high velocity fluid and solids, and also configured with a seal cover arranged between the inner casing and the outer casing, the inner casing being configured with an aperture that, together with the seal cover, creates a related-chamber that is in fluidic communication with the region of the inner casing through which high velocity fluid and solids circulate, but also does not have circulating therein the high velocity fluid and solids, the seal cover being configured to form a corresponding aperture to allow the related-chamber to be in fluidic communication with an external region or location outside the casing assembly; and a pressure relief system comprising:

a rupture disc assembly having a rupture disc configured to be received in the corresponding aperture of the seal cover and to close the related-chamber so communication of the related-chamber with the region subjects the related-chamber and the rupture disc to at least a portion of pressure contained within the inner casing, and also configured to release pressure exceeding a predetermined relief pressure of the rupture disc from the related-chamber to the external region or location, and an exhaust piping arrangement having exhaust piping configured to attach to the casing assembly, couple the rupture disc assembly in the corresponding aperture of the seal cover, and provide from the related-chamber a path for escaping vapor and solids to be directed to the external region or location where the energy can be dissipated.

2. The apparatus according to claim 1, where the rupture disc comprises a surface configured as a flat surface, or a concave surface, or a convex surface.

3. The apparatus according to claim 2, where the surface comprises a scoring pattern configured with at least one line, groove, scratch or notch.

4. The apparatus according to claim 3, where the scoring pattern is configured to have high predictability and reliability in activating at the predetermined relief pressure.

5. The apparatus according to claim 3, where the at least one line, groove, scratch or notch comprises, or takes the form of, one of the following scoring patterns:
  a single straight line, groove, scratch or notch configured diagonally extending about 80% of the total distance of the diameter; or
  two lines, grooves, scratches or notches configured to intersection at a central point and form an X-shape, e.g., including being perpendicular forming a cross or a plus sign; or
  three lines, grooves, scratches or notches configured to meet at a central point and form a Y-shape; or
  five lines, grooves, scratches or notches configured to meet at a central point and form a star shape.

6. The apparatus according to claim 1, where the rupture disc is made of a material that has highly predictable mechanical properties and does not corrode when subjected to an adverse environment.

7. The apparatus according to claim 1, where the rupture disc is configured to rupture when the pressure in the related-chamber substantially correlates to the pressure in a volute of a pump or rotary equipment that is near a maximum allowable working pressure (MAWP) of the volute of the pump or rotary equipment, including where the rupture disc is configured to rupture at about 200 PSI at about 300° F.

8. The apparatus according to claim 1, where the rupture disc assembly comprises a cylindrical wall or body configured to receive and hold the rupture disc.

9. The apparatus according to claim 8, where the cylindrical wall or body and the rupture disc are welded together so as to form an integral unit.

10. The apparatus according to claim 8, where the rupture disc assembly comprises at least one O-ring, and the cylindrical wall is configured with at least one annular groove or channel to receive and hold the at least one O-ring.

11. The apparatus according to claim 1, wherein separation of the rupture disc from the region through which high velocity fluid and solids circulate substantially reduces or prevents wear of the rupture disc which would otherwise result in a premature release of the pressure.

12. The apparatus according to claim 1, wherein the casing assembly is configured to withstand a predetermined internal pressure without rupturing the inner casing or the outer casing, and the predetermined relief pressure of the rupture disc is configured at a rupture pressure that is less than the predetermined internal pressure of the casing assembly, so that the rupture disc ruptures rather than one or more of the inner casing, the outer casing or the seal cover that form part of the casing assembly.

13. The apparatus according to claim 1, wherein the rupture disc assembly comprises a flange configured with at least one related aperture to receive a fastener to couple the flange to an outer surface of the outer casing and the seal cover and the rupture disc assembly in the aperture of the outer casing and the seal cover.

14. The apparatus according to claim 13, wherein the exhaust piping comprises a corresponding flange configured with at least one associated aperture to receive the fastener in order to couple together the corresponding flange of the rupture disc assembly.

15. The apparatus according to claim 1, where the outer casing is configured to surround and support the inner casing and seal cover so as to form the related-chamber.

16. The apparatus according to claim 1, where the inner casing is made of a hard brittle material or a soft elastomeric material, including natural rubber, through which the high velocity fluid and solids circulate.

17. The apparatus according to claim 1, where the outer casing is made of a ductile material, including a ductile iron or steel.

18. The apparatus according to claim 1, where the rupture disc is configured so that, once activated, the apparatus is disabled and cannot be restarted without replacing the rupture disc.

19. The apparatus according to claim 1, where the apparatus comprises, or takes the form of, the pump or rotary equipment, including a centrifugal pump or a positive displacement pump, where fluid or fluid/solids mixtures could be subject to energy input in excess of the ability of the rotary equipment to dissipate that energy, causing buildup of pressure to a point that exceeds the pressure retention capability of the rotary equipment.

20. The apparatus according to claim 1, where the apparatus comprises an ore processing facility having a centrifugal slurry pump configured with the pressure relief system recited in claim 1.

21. The apparatus according to claim 6, where the material is Inconel 600 or stainless steel, including 316 stainless steel.

22. The apparatus according to claim 1, where the rupture disc has a thickness of about 0.008 inches.

23. An apparatus, including a pump or rotary equipment, comprising:
  a casing assembly configured with an inner casing to form a region through which high velocity fluid and solids circulate, configured with an outer casing to form a chamber between the inner casing and the outer casing that does not have circulating therein the high velocity fluid and solids, and also configured with a seal cover arranged between the inner casing and the outer casing, the inner casing being configured with an aperture that, together with the seal cover, creates a related-chamber that is in fluidic communication with the region of the inner casing through which high velocity fluid and solids circulate, but also does not have circulating therein the high velocity fluid and solids, the seal cover being configured to form a corresponding aperture to allow the related-chamber to be in fluidic communication with an external region or location outside the casing assembly; and
  a pressure relief system comprising:
  a rupture disc assembly having a rupture disc configured to be received in the corresponding aperture of the seal cover and to close the related-chamber so communication of the related-chamber with the region subjects the related-chamber and the rupture disc to at least a portion of pressure contained within the inner casing, and also configured to release the pressure exceeding a predetermined relief pressure of the rupture disc from the related-chamber to the external region or location, the rupture disc having a concave surface with a scoring pattern configured with at least one line, groove, scratch or notch; and
  an exhaust piping arrangement having exhaust piping configured to attach to the casing assembly, couple the rupture disc assembly in the corresponding aperture of the seal cover, and provide from the related-chamber a path for escaping vapor and solids to be directed to the external region or location where the energy can be dissipated.

24. The apparatus according to claim 23, where the at least one line, groove, scratch or notch comprises, or takes the form of: one of the following scoring patterns:
- a single straight line, groove, scratch or notch configured diagonally extending about 80% of the total distance of the diameter; or
- two lines, grooves, scratches or notches configured to intersection at a central point and form an X-shape, including being perpendicular forming a cross or a plus sign; or
- three lines, grooves, scratches or notches configured to meet at a central point and form a Y-shape; or
- five lines, grooves, scratches or notches configured to meet at a central point and form a star shape.

25. The apparatus according to claim 23, wherein the rupture disc assembly comprises a flange configured with at least one aperture to receive a fastener to couple the flange to an outer surface of the outer casing and the seal cover and the rupture disc assembly in the corresponding aperture of the seal cover.

26. The apparatus according to claim 25, wherein the exhaust piping comprises a corresponding flange configured with at least one corresponding aperture to receive the fastener in order to couple together the corresponding flange and the flange of the rupture disc assembly.

* * * * *